Sept. 1, 1936. W. F. ALDER 2,052,550
GRAVIMETRIC DETERMINATION OF SOUND AMPLITUDES
Filed July 20, 1932 3 Sheets—Sheet 1
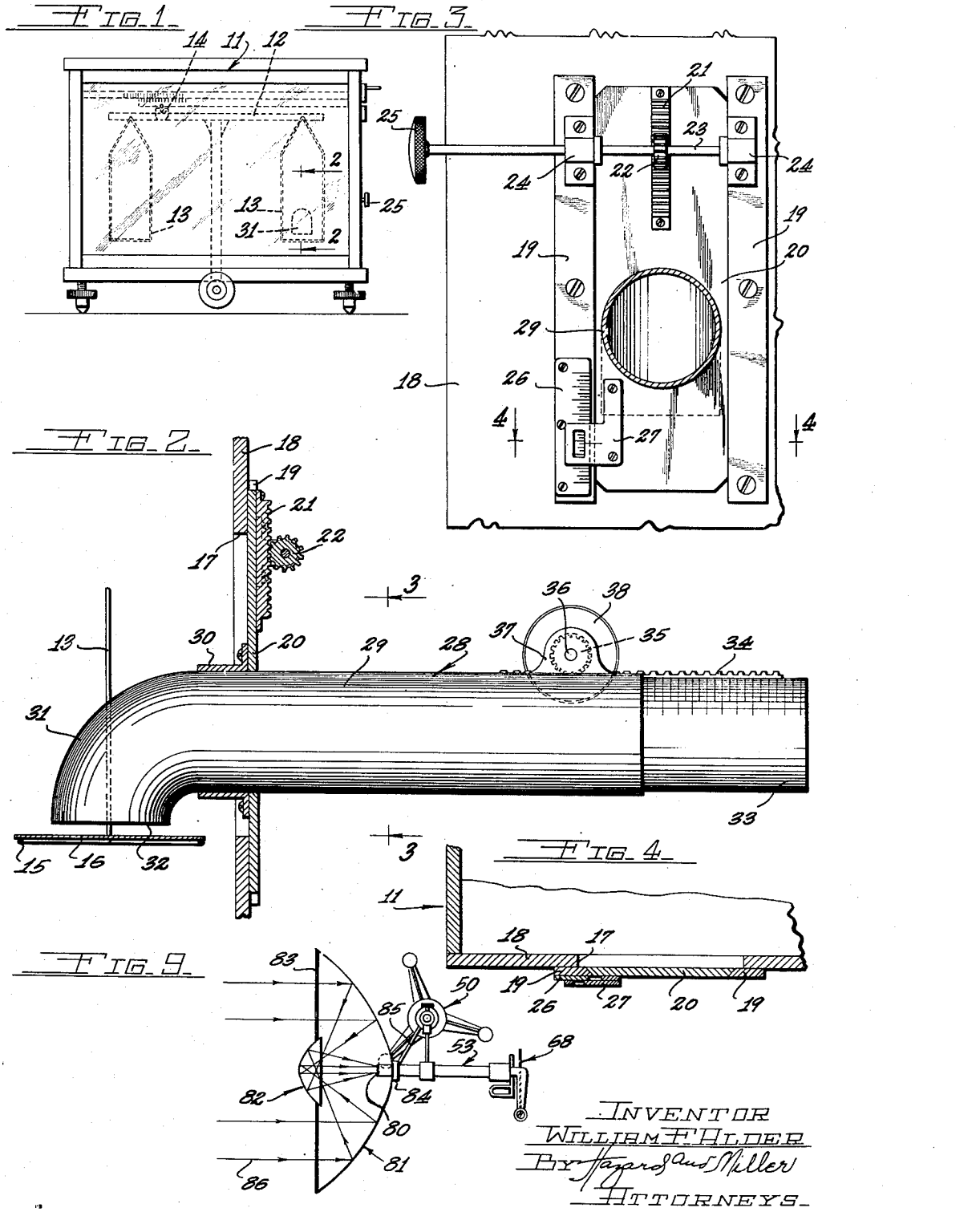
INVENTOR
WILLIAM F. ALDER
By Hazard and Miller
ATTORNEYS

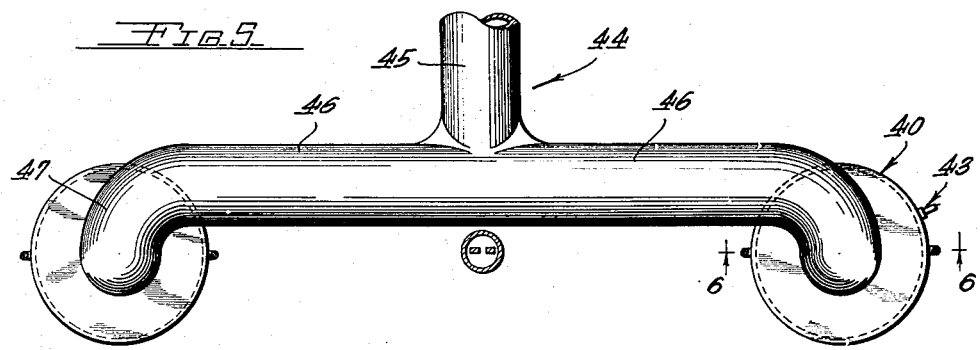
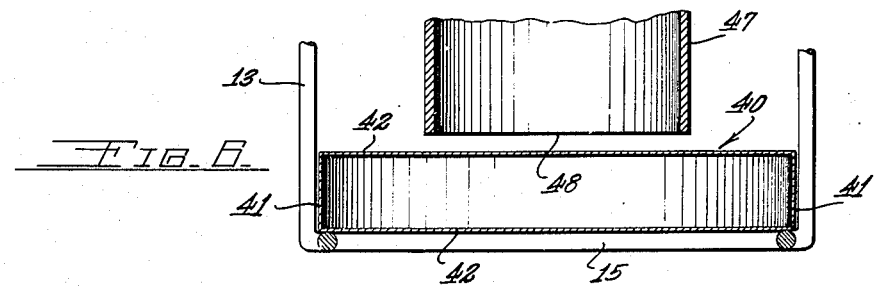
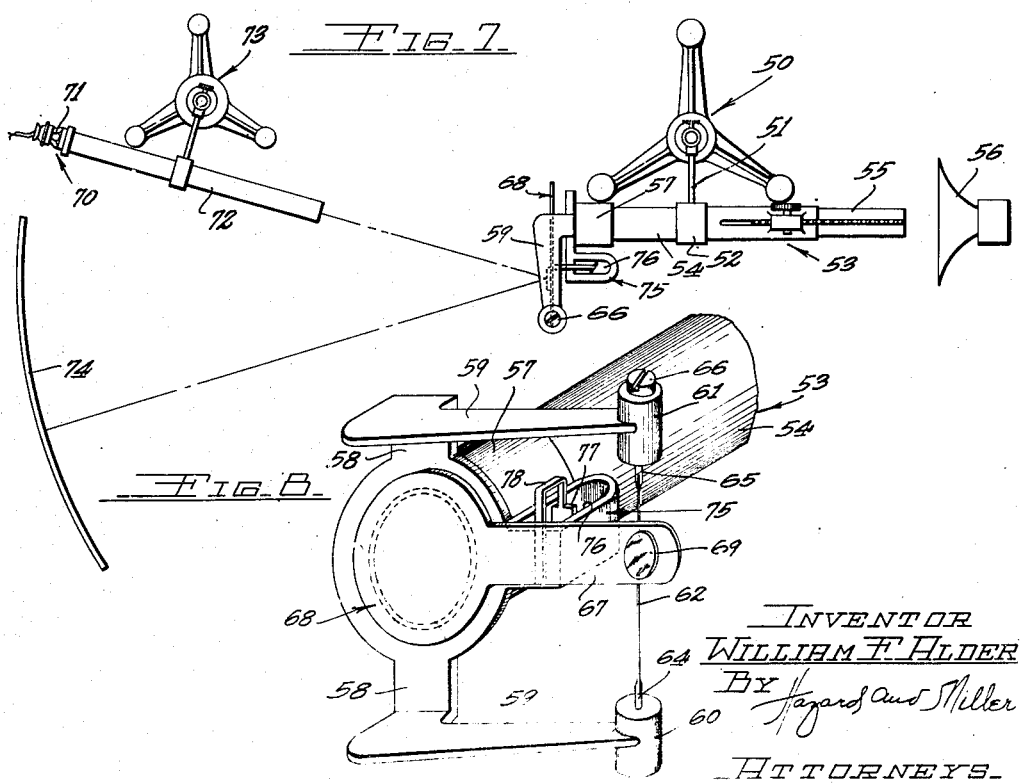

Sept. 1, 1936.    W. F. ALDER    2,052,550
GRAVIMETRIC DETERMINATION OF SOUND AMPLITUDES
Filed July 20, 1932    3 Sheets-Sheet 3
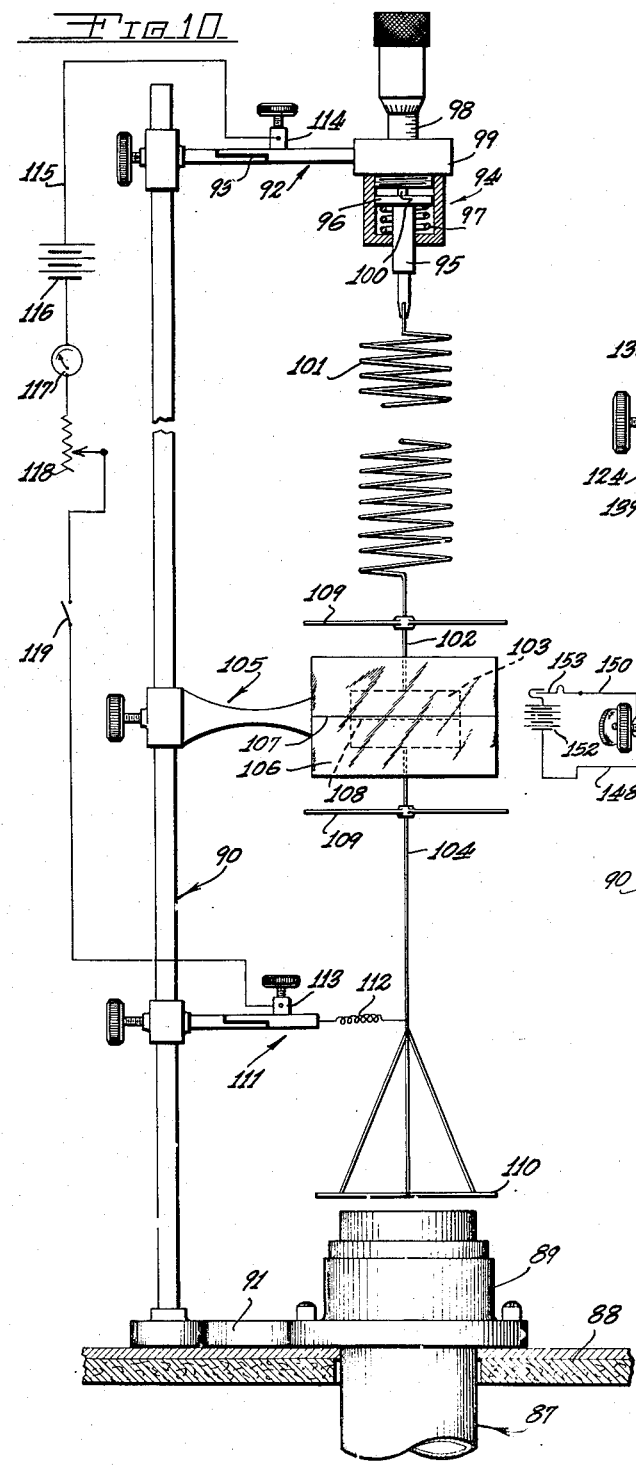
INVENTOR
WILLIAM F. ALDER
BY Hazard and Miller
ATTORNEYS.

Patented Sept. 1, 1936

2,052,550

UNITED STATES PATENT OFFICE 2,052,550

GRAVIMETRIC DETERMINATION OF SOUND AMPLITUDES

William F. Alder, Altadena, Calif., assignor, by mesne assignments, to Jenness A. Alder, Altadena, Calif.

Application July 20, 1932, Serial No. 623,571

21 Claims. (Cl. 73—51)

By a gravimetric determination of sound amplitudes I mean an apparatus by which the amplitudes of sound may be determined in gravity units, such as units of weight, and in units of length and of time, these being, preferably, in metric units. By my system I may determine the force developed by a sound in units of weight such as grams; I may determine the time required by a certain sound to move a known weight a specified distance and, therefore, incorporate into my unit for determining sound amplitude the various elements of the centimeter gram second system (CGS) of measurement.

I make use of the phenomenon that a body heavier than air is drawn toward the open end of a resonator when this is sounding in air, and the reverse phenomenon that a medium lighter than air is repulsed from the responding resonator. I use these phenomena to cause a sound of desired pitch to cause a response in a resonator tuned to this frequency and of a predetermined area. The weight necessary to counteract the attractive or repulsive force may be used to determine the pull or repulsion, for instance, in grams of the particular resonator sound. As another factor I may cause such sound to move the known weight through a fixed distance and determine the time this requires. The phenomenon of acoustic attraction and repulsion is described in the text book designated "Ganot's Physics", Atkinson, under the Book on Sound, Section—Acoustic Attraction and Repulsion, the full title of the text book being "Elementary Treatise on Physics Experimental and Applied", translated from Ganot's "Elements De Physique", by E. Atkinson, published by William Wood and Company, New York. In the eighteenth edition the section on Attraction and Repulsion of Sound is number 293 starting on page 291, and in the fifteenth edition the section is number 294 on page 279.

Apparently, the attractive or repulsive force is due to the amplitude of the sound waves and not to their frequency although the phenomenon holds when use is made of resonators tuned to respond to sound waves of different frequencies, and although the resonator itself may be tuneable to resound the sounds of different frequencies it has been found that the greater the amplitude or loudness of the sound for a specific frequency the greater is the attractive or repulsive force.

An object of my invention in one form is to obtain a gravity measurement using units of weight of the attractive or repulsive force of a resonator responding to sounds of certain definite pitches and for different tests for different amplitudes. In order to accomplish this I may employ a delicate laboratory weighing scale and adjacent one of the pans of the scale I may position the open end of a tuneable resonator. When this resonator is properly tuned to a sound of a definite pitch, the platform of the scale is drawn to or attracted toward the open end of the resonator adjacent the scale. Therefore, by moving a balancing weight, such as a rider, on the beam of the scale, an adjustment may be made, bringing the scale back to its original position before the test of the sound. This, therefore, gives a measurement in gravity units, that is, units of weight of the attractive force of the particular sound wave of definite pitch and, therefore, determines the force in units of weight of this particular sound and its particular amplitude. Tests may also be made by changing the amplitude or loudness of the sound and additional tests may be made with sounds of different pitch and different amplitudes in order to obtain an absolute determination of the pull or repulsion of such sound waves in gravity units.

In addition to utilizing the attraction phenomenon, I may make use of the repulsion factor by using a container with a gas lighter than air and holding the gas adjacent the open end of the resonator, in which case the container with the lighter gas is repulsed. I may combine both the attraction and repulsion features by, in a delicate laboratory weighing scale, having one pan made of a plate and the other pan with a container lighter than air, and utilizing a resonator with two open ends, one over each pan.

A further object of my invention is another manner of determining the attraction or repulsion of sound waves acting on a movable body, in which case I use, preferably, a tuneable resonator which may be accurately tuned to respond to sounds of a definite pitch. Adjacent the open end of this responding resonator, I mount a movable body, this being, preferably, supported on a torsion pivot to swing in a horizontal plane. This body, if heavier than air, and the resonator being sounded in air, will be attracted toward the open end of the resonator. On the torsion pivot I may mount a mirror and reflect light from this mirror to a scale and thus determine the movement of the body, such as a diaphragm, on the torsion balance due to the attractive pull of the responding resonator.

My invention is illustrated in connection with the accompanying drawings, in which:

Fig. 1 illustrates one form of my invention and shows, in elevation, a laboratory weighing scale adapted for use with my invention.

Fig. 2 is a vertical section on the line 2—2 of Fig. 1 in the direction of the arrows, showing a tuneable resonator and its mounting in relation to one of the pans of the weighing scale.

Fig. 3 is a vertical section on the line 3—3 of Fig. 2 in the direction of the arrows.

Fig. 4 is a detail horizontal section on the line 4—4 of Fig. 3 in the direction of the arrows.

Fig. 5 is a plan of an alternate form of resonator.

Fig. 6 is a vertical section on the line 6—6 of Fig. 5 in the direction of the arrows, showing a gas container adjacent the open end of the resonator.

Fig. 7 is a plan of an alternate form of my invention for obtaining readings by means of a light beam.

Fig. 8 is a perspective view of a torsion balance with a moving diaphragm mounted on the end of a resonator.

Fig. 9 is a diagram of a sound detector adaptable for sound signaling.

Fig. 10 is an elevational diagram showing the adaption of a Jolly balance to the gravimetric determination of sound characteristics.

Fig. 11 is an elevational diagram showing a timing mechanism for use in the gravimetric determination of sound characteristics using the balance of Fig. 10.

Referring first to the construction of Figs. 1 through 4, I indicate a laboratory type of weighing scale 11. This has a beam 12 with a pair of suspended baskets 13, the beam and the baskets being mounted inside of a cabinet. The front of the cabinet is provided with a glass window. The beam is indicated as having an adjustable rider 14 which may be shifted on the beam. The rider may be manipulated from outside the cabinet and also the beam may be brought into and out of action outside of the cabinet. This is done by standard equipment of high grade precision scales.

In my invention I modify the scale by, preferably, forming the basket with a ring 15, on which may rest the platform 16 of a scale.

I modify the cabinet by making an opening 17 in the back wall 18, and adjacent this opening there are a pair of guide tracks 19, between which operates a holder plate 20. This plate has a rack 21 and is operated by a pinion 22 on a pinion shaft 23, which shaft has journals 24 on the guide tracks, and the shaft may be manipulated by means of a knurled head 25. One of the rails has a scale 26 secured thereto and a vernier attachment 27 is secured to the movable plate, thus giving vernier readings. The scale is preferably graduated in the metric measure.

A resonator tube 28 is indicated as having a cylindrical section 29 which extends through an opening in the plate 20 and is fitted in a collar 30. The inner end of this tube has an elbow 31 so that there is an open end 32 which may be positioned adjustable distances from the platform 16 of one of the scales. The resonator is illustrated as being tuneable, having a telescopic cylindrical section 33 with a rack 34 thereon. This may be moved by a pinion 35 secured to a shaft 36 mounted in a journal 37 in the resonator tube and operated by a finger operating head 38.

By this construction the resonator tube may be raised and lowered in order to position the open inner end 32 a desired distance from the pan of the scale. The resonator may also be accurately tuned to respond or resonate to a sound of a definite pitch. The sound source is not illustrated as this may be of any suitable type. It may be a tuning fork or a loud speaker operated by a vacuum tube oscillator, which oscillator may be regulated to develop sounds of different intensities and different pitches.

When the platform is formed of metal or material heavier than air and the resonator tube is in proper resonance with the source of sound, the pan 16 is lifted or attracted toward the mouth of the resonator. This lifts one side of the scale and the rider 14 may be adjusted on the beam to counterbalance this lift and bring the platform to its original position. Then the reading may be made of the weight, such as the number of milligrams necessary to counteract the attractive pull of the responding resonator. It will be manifest, of course, that the open mouth of the resonator tube may be located below the tray and, hence, pull the platform downwardly.

In Figs. 5 and 6 I show a modified construction. In this case on the ring 15 there is placed a gas container 40. This is illustrated as having metal side walls 41 and upper and lower closure walls 42 which are preferably made of rubber or some thin diaphragm-like material. The container may be filled with gases lighter than air by means of a filling tube and valve 43. In this case the resonator tube 44 has one section 45 positioned to receive the sound from the sound source. There are then two branches 46, each having a down-turned end 47 to locate the open ends 48 on one side adjacent the pan formed of the gas body and the other pan formed of the metal plate. With this arrangement, due to the phenomena of the sounds and air, the gas body lighter than air is repulsed, and the platform heavier than air is attracted toward the open mouth of the resonator, a double action may be obtained, that is, a repulsion on one side and an attraction on the other, thus giving greater movement to the scale. A test may be made of a gas in a container which forms a single pan in which case the other pan of a double scale may have a duplicate container with the same gas, or the other pan, if solid, may be used to balance a single gas container. Thus, the resonator tube may be single-ended and this end located over the single container when one is used, or over one of the gas containers where two gas containers are used.

In the alternative form of Figs. 7 and 8, I illustrate an apparatus in which a light beam is used to obtain readings of various movements of the diaphragm attracted or repulsed by the sound resonator. In this construction I employ a stand 50 which has a vertically adjustable arm 51 on which there is a collar 52. Fitted in this collar there is a tuneable resonator 53. This resonator has a main tube 54 and a telescopic tube 55 adjusted somewhat as illustrated in connection with Fig. 2. A source of sound, such as a loud speaker 56, is indicated as a sound source. I find a suitable manner of obtaining various sound frequencies is to use a vacuum tube oscillator with suitable amplification.

On the end of the resonator tube 54 I attach a collar or ring 57. This has two oppositely projecting tongues 58, from which there are upper and lower brackets 59. To the lower of these brackets there is attached a block 60 and to the upper bracket a sleeve 61. A torsion wire 62 is attached at its lower end to a pin 64 projecting from the block 60 and at its upper end to a pin 65 which is secured to the screw threaded plug 66 threaded in the sleeve 61. This allows a suitable tension to be exerted on the portion 62 and this wire may be placed under a desired torsional twist.

A horizontal arm 67 is secured to the torsion wire and on the end of this arm there is a diaphragm 68 preferably formed integral therewith. This diaphragm is positioned to be directly opposite the open end of the resonator 53 remote from the sound source. A mirror 69 is secured to the arm 67 in such a position as to be bisected by the torsion wire. A light source 70 comprises a lamp 71 mounted in a light directing tube 72, which tube is carried by a movable stand 73. The light is reflected on to a curved scale 74. This scale and light source may be constructed somewhat as illustrated in my patent application for Acoustic testing apparatus and method of operation, filed March 9, 1932, Serial No. 597,828.

In order to dampen the oscillations of the diaphragm, I provide a dash pot construction 75. This employs a trough 76 which is secured to the ring 57 and in this operates a paddle 77 on an arm 78 attached to the arm 67. The trough may be filled with oil or other liquid.

In the operation of the device of Figs. 7 and 8, normally the torsion of the wire is adjusted so that the diaphragm is transverse to the axis of the resonator 53. The ring 57 may be adjusted longitudinally of the resonator to position the diaphragm at different distances from the mouth end of such resonator. When the resonator responds to the desired sound frequency from the sound source, an attractive force pulls the diaphragm toward the open end of this resonator and thus the reflected light beam moves on the scale 74 and a reading may be obtained of the normal or resting position and the position at the full extent of movement and thus tests and readings may be obtained for the movement of the light on the scale for sounds of the same pitch but of different amplitudes; then the resonator may be adjusted for sounds of different pitch, and tests made of sounds of similar amplitudes. A gas container may be attached to the arm 67 in substitution of the diaphragm 68 when it is desired to test the action of sound on gases.

In order to determine the characteristics of the sound in the resonator of known cross sectional area in relation to time, the mouth of the resonator may be positioned adjacent the pan of a weighing scale or the diaphragm of a torsion balance or the equivalent. Where a scale is used this may be weighted so that the scale is not balanced. The distance through which it can travel when subjected to the attraction or repulsion of sound is definitely fixed and, preferably, by means of a chronograph or other delicate time recording instrument, the time may be determined from the moment the pan is released for movement and the instant at which it has traveled a predetermined distance, this being subjected to the constant resonating action of the resonator. This procedure, therefore, establishes three definite factors. The weight, for instance, in milligrams, which is caused to be moved by the resonating sound, the distance through which this moves, and the time required for such movement. The equivalent may be done by means of a torsion balance in which a moving diaphragm is located adjacent the end of the resonator, in which case the torsion wire may be adjusted to develop a force contrary to that of the resonator. A distance of movement for the diaphragm may be established and the time required for this movement determined by timing appliances. Note the construction of Figs. 1 through 4, 10 and 11.

In Fig. 9 I illustrate an adaptation of my invention for purposes of sound signaling, that is, for detecting sounds by means of the action of the resonator. In this illustration, the tuneable resonator 53 is indicated as mounted on a stand 50 the same as in Fig. 7, but in this case the open mouth 80 of the resonator extends through a large, preferably, parabolic reflector 81 from the back and is located at the focus of a small parabolic reflector 82. The reflector 82 may be secured to the reflector 81 by means of arms 83 and the reflector 81 may have a hub 84 with an arm 85 connecting this hub to the stand 50. The direction of the incoming sound waves is indicated by the lines 86 having arrows. The sounds are concentrated by the large reflector onto the small reflector and from the small reflector into the resonator, causing this to respond, which when responding will give a movement to the diaphragm 68 and thus indicate the reception of a sound which may be from some signaling source.

In Fig. 10 I illustrate a Jolly balance construction for determination of sound characteristics. In this a resonator 87 is indicated as mounted on the top 88 of a sound chamber. Such sound chamber may be a closed chamber of the type illustrated in Figs. 9 and 10 of my patent application for a Portable closed chamber determination of sound absorption, Serial No. 623,570, filed July 20, 1932. The resonator passes through a collar 89 secured to the top of the sound box and may be adjustable therein. A stand 90 formed of a rod extends upwardly from the base 91. At the top this has an adjustable arm 92, such arm having an insulating section 93. The arm is provided with a cup 94 having a plunger 95 extending downwardly therethrough. This plunger has a head 96, which head is held elevated by a compression spring 97. A micrometer screw 98 is threaded through a plug 99 which is screwed into the cup 94. The micrometer screw has a pressure end 100 to bear on the head 96 and force downwardly on the spring. The plunger 95 has a suspension spring 101 connected thereto, this spring being preferably first coiled in one direction and then in the opposite direction for compensation. A vertical wire 102 forms an extension to the spring and attached to this wire there is a light weight cylinder 103 and from this cylinder depends a second wire 104. An adjustable arm 105 is mounted on the stand and holds a glass cylinder 106. This cylinder has a horizontal guide line 107 etched thereon, this extending around the circumference of the glass cylinder, and the cylinder 103 also has a line 108 etched on its circumference. Bringing these lines into alignment indicates a zero position for the scale. The wires 102 and 104 have stop arms 109 adapted to engage the glass cylinder 106 and prevent excessive movement of the scale. The wire 104 suspends a pan 110, which pan is located over the open mouth of the resonator 87.

The device may be operated in the manner of a Jolly balance in which when the resonator is responding to a sound the scale is pulled down until the lines 108 and 107 move out of alignment. The micrometer screw may then be adjusted to bring these into alignment and when the sound is cut off and the resonator is silent the scale pan will move up, bringing the line 108 above the line 107. Weights may then be placed in the scale to move the pan downwardly to again bring the lines into alignment and, hence, a reading of the force or weight developed by the sound is indicated by the weights necessary to apply to the scale.

I may also use the Jolly balance with an electrical means for recording the downward pull of the resonator in electrical units. In this case I attach an insulated arm 111 to the stand and have a flexible electric lead 112 from this arm to the wire 104. Such wire, the cylinder 103, the wire 102, the spring 101, the cup, and part of the arm 92, form a conductor. There is a terminal 113 on the arm 111 and a terminal 114 on the arm 92. An electric connection 115 is made from these terminals through a battery 116 or a source of power, a milliammeter 117, and a variable resistance or rheostat 118, there being a circuit closing switch 119 in the circuit.

This construction relies on the function of an electric current flowing through the turns of the wire 101, causing a mutual attraction of the wires which are coiled in the same direction and give, therefore, a lift on the scale. When the resonator is responding to a sound and exerting a downward pull on the scale, the current is adjusted by means of the rheostat 118 until the lines 107, 108 are maintained in alignment. The current may then be read in milliammeters and a determination made in electrical units of the force required to counteract or balance the resonator sound.

In Fig. 11 I have illustrated an electrical timing mechanism for use in the gravimetric determination of sound. In this case I illustrate a resonator 120 with a scale 110 of the Jolly balance thereabove, and this scale is provided with a magnetic section 121 and a small electromagnet 122 is supported on the adjustable arm 123, this arm being mounted on the stand 90. Fig. only shows part of the Jolly balance of Fig. 10 and tests may be made by using scale weights as described in connection with Fig. 10 or using the electric connection to obtain measurements in electric units.

A bracket 124 is also mounted on the stand and has a pair of lower fixed contacts 125 thereon mounted on an insulating base 126, and an upper pair of contact points 127 mounted on an upper flexible insulating base 128. The rigid arm 129 has a micrometer screw 130 extending therethrough which may press on the base 128 and adjust the distance apart of the contact points 125 and 127. The distance apart of these contact points 125 and 127 can be accurately measured to obtain the distance, for instance, in millimeters. In this case one of the stop rods 109 is provided with an insulating ring 131 in which there is supported a bridging or contact plate 132, this being adapted to form a contact with either the two upper contact points 127 or the two lower contact points 125.

The timing system comprises a chronograph cylinder 133 which may be driven in any suitable manner and has a marking pen 134 to bear thereon. This pen is normally moved upwardly by a spring 135 and is held down by an electromagnet 136, there being an armature 137 secured to the pen. The bracket 124 is provided with an upper terminal 138 and a lower terminal 139. An electric lead 140 is taken from the electromagnet through a battery 141 and connects to the upper terminal, and a second lead 142 connects to the lower terminal. The upper terminal also has a lead 143 which connects to one of the lower contact points 125. A third lead 144 also connects to one of the contact points 127. The lower terminal has a lead 145 connected to one of the upper contact points and a lead 146 to one of the lower contact points. The electro-magnet 122 has its electrical connections preferably passing through the arm 123, which arm is adjustable by means of a collar 147 on the stand 90. One lead 148 connects to a terminal 149 on the collar and another lead 150 connects to another terminal 151 on the collar. These leads are energized by a battery 152 and there is a circuit closing switch 153.

With this construction to measure the time required to move the scale a certain distance, it is preferable to apply adjustable covers 154 and 155 to both open ends of the resonator. These are both connected together by means of a shaft 156 journaled in sleeves 157 and operated by a lever 158. When the proper sound is developed the magnet 122 may be energized by closing the switch 153. This holds the pan of the scale from moving. The chronograph will also be operating and as the scale is in its upper position a circuit is developed through the two upper contact points 127, the bridging piece 132, which energizes the magnet 136, which pulls down on the pen 134, causing a mark on the chronograph cylinder. The covers 154, 155 are opened and allow the resonator to build up its proper resonance for a suitable length of time. Then the switch 153 controlling the electromagnet is opened, de-energizing such magnet and allowing the scale to be attracted by the operating resonator. This immediately causes a downward movement of the bridging piece 132 and opens the circuit of the electromagnet 136, allowing the pen 134 to move upwardly at the urge of the spring 135. When the bridging piece 132 bridges the contact points 125 the magnet is again energized and brings the pen into action on the chronograph. Thus there is a space left on the chronograph indicating the time interval requiring the scale to move a predetermined vertical distance between the contacts 125 and 127. Therefore, by this construction I may determine the time required to move the scale a predetermined distance, and by means of weights I may determine the attractive force of the sound in the responding resonator.

A gas container such as 40 of Fig. 6 may be substituted for the solid pans 110 of Figs. 10 and 11 depending upon whether it is desired to make the tests with materials or gasses heavier or lighter than the sound transmitting medium. The scale pan may thus be considered in the form of a solid sheet or a hollow container. If a repulsible gas is to be tested with the apparatus of Fig. 11 the electromagnet 122 may be placed below the gas container to hold the container downwardly and the bridge piece 132 in contact with the lower contact points 125. Then, when the gas container pan is released by the electromagnet and reaches the second contact, contact with the chronograph will be made by the contact points 127.

If it is desired to simplify the manipulation of the device the electromagnet and the electrically controlled chronograph may be disused. On account of the pans moving comparatively slowly the scale pan, whether solid or as a gas container, may be held from movement and released by hand, and the chronograph marker may also be manipulated by hand, in fact, time tests for movement of the scale pan may readily be made using a scale of the type of Fig. 1 by releasing the scale manually for operation and timing the movement of the scale with a stop watch, or the like, having seconds and fractions of seconds graduations. Also, the time of movement of the diaphragm 68 of Fig. 8 may also be tested by a chronograph or stop watch, the diaphragm being released manually for operation.

A test can be made by adjusting the spring of the balance to exert a pull equivalent to a weight on the pan of a scale, then the power generated in the resonator exerts a force to attract the pan scale and give it a movement through a predetermined distance from rest in a measurable time. I may, therefore, obtain a unit for measuring sounds incorporating the elements of moving a predetermined weight from rest through a predetermined distance in a measurable time. A convenient system of units of the C. G. S. system would be to use the weight of one gram, the distance of one centimeter, and the time of one second. I have, therefore, tentatively utilized a unit of measurement for sound, such being the power required to move one gram from rest through one centimeter in one second. This I have designated as a sound power unit and as such unit is too large the power may be measured in microunits. The unit being founded on the C. G. S. system may be translated into the term of weights or decimal units of weights.

It is obvious that units of measurement may be obtained with the balance scale in which one pan would be weighted and the scale moved against this weight a predetermined distance, the time then being measured.

From the above construction it will be seen that I may obtain a determination of the sound characteristics by gravimetric or electrical measurements and I may determine the force developed by the resonator in terms of measures of weight, such as grams, or I may determine the work which this force can do by a measurement of the distance through which the scale pan may be moved. The power developed in the resonator may also be determined by consideration of the time factor in which the units of weight, the distance moved, and the time, are taken into consideration. By the electrical system of measurement by the voltage being known, I may determine the power in weights developed by the resonating tube and thus establish a relation between the mechanical gravimetric units and the electrical units.

In the claims where I use the term "pan" in reference to a scale pan it is to be understood that this may be either of solid construction or a gas container.

My present invention as regards determination of sound uses different appliances for sound amplitude determination from that of my patent application above mentioned, and also of my patent applications: Apparatus and method for determining amplitude of sound, filed October 22, 1931, Serial No. 570,486; Acoustic testing apparatus and method of operation, filed March 9, 1932, Serial No. 597,828; and Hydrostatic sound amplitude meter, filed Sept. 21, 1932, Serial No. 634,190.

Various changes may be made in the details of construction without departing from the scope of the invention as defined by the appended claims.

I claim:

1. A sound measurement apparatus comprising a non-vibrating movable body of a known weight, means to develop sound adjacent such body whereby said body may be moved by being attracted or repulsed to or from the source of sound, means to limit the distance of movement of the body in the attraction or repulsion, and means to determine the time required for such movement.

2. A sound measurement apparatus comprising a resonator, a non-vibrating movable body positioned adjacent one end of such resonator, said resonator being responsive to the desired sound whereby said body may be moved relative to the resonator, and means to determine the weight necessary to hold said body stationary by counteracting the attractive or repulsive force.

3. A sound measurement apparatus comprising a resonator responsive to a desired sound, a non-vibrating movable body positioned adjacent the end of the resonator, means to determine the weight of said body, means to limit the distance of movement of the body during its movement due to attraction or repulsion, and means to determine the time required in such movement.

4. A sound measurement apparatus comprising a resonator responsive to a desired sound, a weighing appliance, means to position the open end of the resonator adjacent a movable element of the weighing appliance, said element having the characteristic of being moved relative to the open end of the resonator when responding to sound, said weighing appliance having means to counteract the attraction or repulsion and to hold said element of the weighing appliance stationary, and means to determine the value of the counteracting weight.

5. A sound measurement apparatus comprising a resonator responsive to a desired sound, a weighing appliance having a movable element adapted to be positioned adjacent the end of the resonator, means for weighting the movable element with a known weight, means to limit the distance of movement of said weighted element in its attraction or repulsion relative to the resonator when responding to the sound, and means to determine the time interval required to move said element with the predetermined weight through the predetermined distance.

6. A sound measurement apparatus comprising a resonator responsive to a desired sound, a movable element mounted to move either to or from the resonator due to an attraction or repulsion of the responsive resonator relative to the movable element, means to exert a resistance to the movement of said element, and means to indicate the repulsive or attractive force of the resonator acting on said element in reference to the resistance to the movement of such element.

7. A sound responsive apparatus comprising a resonator responsive to a desired sound, a movable element positioned adjacent the end of the resonator, said element being movable toward or from the resonator due to the attraction or repulsion of the responding resonator, means to exert a known resistance to the movement of said element, means to limit the distance of movement of such element, and means to indicate the time required for the movement of said element between its limits due to the attraction or repulsion of the responding resonator.

8. A sound measurement apparatus comprising a resonator responsive to a desired sound, a coiled spring balance having a pan suspended thereby, the pan being adjacent the open end of the resonator, an electric circuit through the coils of the spring and having electrical measuring instruments therein, means to energize the electric circuit to equalize the attractive pull of the resonator on the pan and therefore obtain a reading in electrical units of the power developed in the resonator.

9. A device for indicating sound signals, comprising a resonator open at both ends, means to concentrate the sound signal at one end of the resonator, a movable diaphragm positioned adjacent the opposite end of the resonator, said diaphragm being mounted to be attracted toward the resonator when such resonator responds to a received sound of the proper pitch.

10. A sound measurement apparatus, comprising a spring scale having a suspended pan, the pan being positioned above the open mouth of one end of a resonator, means to adjust the tension of the spring, and a measuring means to indicate the movement of the pan and means to cause the resonator to develop a sound.

11. In a sound measuring apparatus, a scale having a coiled spring and a pan, an electric circuit having electrical measuring instruments therein connected through the coiled spring, said instruments being adapted to regulate the current and to indicate the current required to counteract a pull on the pan and a vibrating means adjacent to the pan to develop an attraction between the vibrating means and the pan.

12. In a device as described, the combination of a vibrating body in a vibration transmitting medium, a second non-vibrating body, and means to measure the force developed by the relative attraction or repulsion between the vibrating body and the said second body.

13. In a device as described, the combination of a sound transmitting medium, a first body vibrating to sounds, a second non-vibrating body, and both bodies being immersed in said medium, and means to measure the force developed by the relative attraction or repulsion between the vibrating body and the second body.

14. A sound measuring apparatus comprising a non-vibrating body, means to develop a vibration due to sound adjacent said body, the body and said means being relatively movable, and means to establish a weight or force necessary to balance the attraction or repulsion between said vibration means and said body to prevent their relative movement.

15. A sound measurement apparatus comprising a non-vibrating body of known weight, means to develop vibration due to sound adjacent said body, whereby said body and said vibration developing means may be relatively attracted or repulsed, means to limit the distance of relative movement of the body and said vibration means due to the attraction or repulsion, and means to determine the time required for such movement.

16. A sound measurement apparatus comprising a movable body, means to develop a sound adjacent said body whereby said body may be attracted towards or repulsed from the source of sound, and means to measure the attractive or repulsive force.

17. A sound measurement apparatus comprising a resonator responsive to a desired sound, a balance having a scale pan positioned adjacent the open end of the resonator, the resonator exerting a force on the pan tending to move the pan, means to exert a second force to counteract the first mentioned force, and means to obtain a reading in units of weight of the equivalent of the second force.

18. A sound measurement apparatus comprising a resonator responsive to a desired sound, a balance having a scale pan positioned adjacent the open end of the resonator, the resonator being adapted when responding to sound to move the pan, and means to obtain a reading in units of weight of the force required to move said pan.

19. A sound measurement apparatus, comprising a resonator responsive to a desired sound, a balance having a gas container positioned adjacent the open end of the resonator, the resonator being adapted when responding to sound to move the gas container, and means to obtain a reading in units of weight of the force required to move said container.

20. A sound measurement apparatus, comprising a resonator responsive to a desired sound, a balance having an element positioned adjacent the open end of the resonator, the resonator exerting a force on the element tending to move the element, means to exert a second force through the balance to counteract the first force, and means to obtain a reading in units of weight of the equivalent of the second force.

21. A sound measuring apparatus, comprising a resonator responsive to a desired sound, a balance having an element positioned adjacent the open end of the resonator, the resonator attracting or repelling the element, means to exert a pull through the balance to counteract the attracting or repelling force, and means to obtain a reading in units of weight of the equivalent of the pull.

WILLIAM F. ALDER.